United States Patent
Baumgartner et al.

(10) Patent No.: US 9,542,535 B1
(45) Date of Patent: Jan. 10, 2017

(54) SYSTEMS AND METHODS FOR RECOGNIZING BEHAVORIAL ATTRIBUTES OF SOFTWARE IN REAL-TIME

(75) Inventors: Kurtis J. Baumgartner, Boulder, CO (US); Matthew Boney, Boulder, CO (US)

(73) Assignee: Symantec Corporation, Mountain View, CA (US)

( * ) Notice: Subject to any disclaimer, the term of this patent is extended or adjusted under 35 U.S.C. 154(b) by 881 days.

(21) Appl. No.: 12/546,953

(22) Filed: Aug. 25, 2009

Related U.S. Application Data

(60) Provisional application No. 61/091,552, filed on Aug. 25, 2008.

(51) Int. Cl.
G06F 9/45 (2006.01)
G06F 21/00 (2013.01)

(52) U.S. Cl.
CPC ..................... G06F 21/00 (2013.01)

(58) Field of Classification Search
None
See application file for complete search history.

(56) References Cited

U.S. PATENT DOCUMENTS

| | | | |
|---|---|---|---|
| 5,751,942 A * | 5/1998 | Christensen et al. | 714/38.13 |
| 5,960,199 A * | 9/1999 | Brodsky et al. | 717/128 |
| 5,991,817 A * | 11/1999 | Rowett et al. | 709/250 |
| 6,230,313 B1 * | 5/2001 | Callahan et al. | 717/128 |
| 6,502,102 B1 * | 12/2002 | Haswell et al. | |
| 6,519,605 B1 * | 2/2003 | Gilgen | G06F 9/45504 |
| 6,775,825 B1 * | 8/2004 | Grumann et al. | 717/127 |
| 6,973,577 B1 * | 12/2005 | Kouznetsov | 726/25 |
| 7,020,677 B1 * | 3/2006 | Baillif et al. | 709/201 |
| 7,092,864 B2 * | 8/2006 | Roesner et al. | 703/14 |
| 7,657,872 B2 * | 2/2010 | Kelbaugh et al. | 717/124 |
| 7,809,670 B2 * | 10/2010 | Lee et al. | 706/59 |
| 7,895,651 B2 * | 2/2011 | Brennan | 726/22 |
| 7,979,889 B2 * | 7/2011 | Gladstone et al. | 726/1 |
| 2004/0117768 A1 * | 6/2004 | Chang et al. | 717/125 |
| 2005/0132336 A1 * | 6/2005 | Gotwals et al. | 717/127 |
| 2007/0294699 A1 * | 12/2007 | Bahl et al. | 718/104 |
| 2008/0148239 A1 * | 6/2008 | Petrov et al. | 717/128 |
| 2008/0263309 A1 * | 10/2008 | Attinella | 711/173 |
| 2009/0013312 A1 * | 1/2009 | Albert | G06F 11/3636 717/128 |
| 2009/0165137 A1 * | 6/2009 | Yoo et al. | 726/24 |
| 2009/0228871 A1 * | 9/2009 | Edwards et al. | 717/128 |
| 2010/0281460 A1 * | 11/2010 | Tillmann et al. | 717/106 |

(Continued)

OTHER PUBLICATIONS

"Learning Patterns From UNIX Processes Execution Traces for Intrusion Detection" by Wenkee Lee et al., 1997, pp. 1-7, [online], [retrieved on Apr. 5, 2012]. Retrieved from <http://secgate-b.hacktory.cs.columbia.edu/sites/default/files/wenke-aaai97.pdf>.*

*Primary Examiner* — Evral E Bodden
(74) *Attorney, Agent, or Firm* — Holland & Hart LLP

(57) ABSTRACT

A computer-implemented method for recognizing behavioral attributes of software in real-time is described. An executable file is executed. One or more runtime events associated with a behavior of the executable file are traced. The one or more traced runtime events are translated to a high level language. A recognizable pattern of the translated traced runtime events is produced. The pattern is a unique behavioral set of the translated traced runtime events.

20 Claims, 3 Drawing Sheets

(56) References Cited

U.S. PATENT DOCUMENTS

2013/0268258 A1* 10/2013 Patrudu .................... G06N 5/02
                                                        704/2
2015/0066881 A1*  3/2015 Sundaram ............... H04L 45/70
                                                        707/693

* cited by examiner

SYSTEMS AND METHODS FOR RECOGNIZING BEHAVORIAL ATTRIBUTES OF SOFTWARE IN REAL-TIME

RELATED APPLICATIONS

This application is related and claims priority to U.S. Application No. 61/091,552 filed 25 Aug. 2008 and titled BEHAVIORAL RECOGNITION OF SOFTWARE IN REAL-TIME.

The present invention generally relates to methods, systems and/or software for providing monitoring or security services to computer systems, and more particularly to a method of and system for recognizing behavior of software in real-time.

BACKGROUND

Currently, a massive number of unknown executable software and machine code files are created and released around the world every day. Each individual executable file, application, program, piece or package of software, or the like, whether malicious or non-malicious, may be recognized by behavioral based security software if that security software is to be efficient and effective.

Each minor change in compiled software may modify the software's static fingerprint, whether the software is malicious or non-malicious. As the general use of computer systems increases exponentially, new and modified software is being released and installed on computer systems around the world at an accelerating rate.

Methods of obfuscating the static and dynamic makeup of software are continually being created and implemented for various reasons. Methods to evade security solutions based on scanners and emulators are also being implemented. These changes, as well as the accelerating rate of software installation, impose additional burdens for security software solutions to be able to recognize unknown software.

These burdens are causing unacceptable delays in accurate identification of unknown software by security software. This status quo can also cause inaccurate identification of software, resulting in both false positives and false negatives by current security software, such as for example scanners, anomaly detection, and behavioral based security software. As a result, there is a need for a method, system, computer program product, software application, article and/or computer readable medium of instructions recognizing behavioral attributes of software in real-time.

BRIEF SUMMARY

A server-implemented method for recognizing behavioral attributes of software in real-time is described. An executable file is executed. One or more runtime events associated with the behavior of the executable file are traced. The one or more traced runtime events are translated to a high level language. A recognizable pattern of the translated traced events is produced. The pattern is a unique behavioral set of the translated traced events.

In one embodiment, the recognizable pattern may be distributed to one or more client terminals. The recognizable pattern may be distributed to the one or more client terminals via a web server.

In one configuration, the one or more runtime events are traced using Application Programming Interface (API) calls. In an additional configuration, the one or more runtime events are traced using subroutine calls.

In one example, the high level language describes absolute memory locations of the one or more traced runtime events. In one embodiment, runtime events to translate to the high level language may be manually identified. In another embodiment, runtime events to translate to the high level language may be automatically identified.

A client-implemented method for recognizing behavioral attributes of software in real-time is also described. One or more recognizable patterns are received from a server. The one or more patterns are associated with runtime events of an executable file. An unidentified executable file is executed. Runtime events associated with the unidentified executable file are monitored. The monitored runtime events are associated with a recognizable pattern received from the server. The unidentified executable file is identified based on the recognizable pattern associated with the monitored runtime events.

In one embodiment, kernel based components may be implemented to monitor the runtime events of the unidentified executable file. The unidentified executable file may be identified as a malicious executable file. In another embodiment, the unidentified executable file may be identified as a non-malicious executable file.

A server system configured to recognize behavioral attributes of software in real-time is also described. The system includes a processor and memory in electronic communication with the processor. The server is configured to execute an executable file, and trace one or more runtime events associated with the behavior of the executable file. The server is also configured to translate the one or more traced runtime events to a high level language, and produce a recognizable pattern of the translated traced events. The pattern is a unique behavioral set of the translated traced events.

In a specific, but non-limiting example, the process of recognizable pattern creation and recognition involves different steps being performed at a server side and a client side. These example steps include:

1. A software package (or the like) is obtained (server side);
2. The software package is run on a processing system producing traces of behavior, i.e., traced events (server side);
3. Logs are analyzed, for example by a researcher and/or an automated system (server side);
4. Recognizable patterns are created by the researcher and/or the automated system, describing a uniquely recognizable set of traced events (server side);
5. Recognizable patterns are distributed to client terminals, for example via a web server (although various other server types can be used) (server side to client side);
6. Recognizable patterns are loaded at client terminals (client side);
7. Recognizable patterns are used by an engine to recognize unknown software packages (or the like) as a part of a known family when unknown software packages are run on client terminals (client side).

In a specific non-limiting example, tracing is performed by using API calls, subroutine calls, loaded modules, parameter values, and/or in-memory data.

BRIEF DESCRIPTION OF FIGURES

Example embodiments should become apparent from the following description, which is given by way of example

PREFERRED EMBODIMENTS

Figure 1:
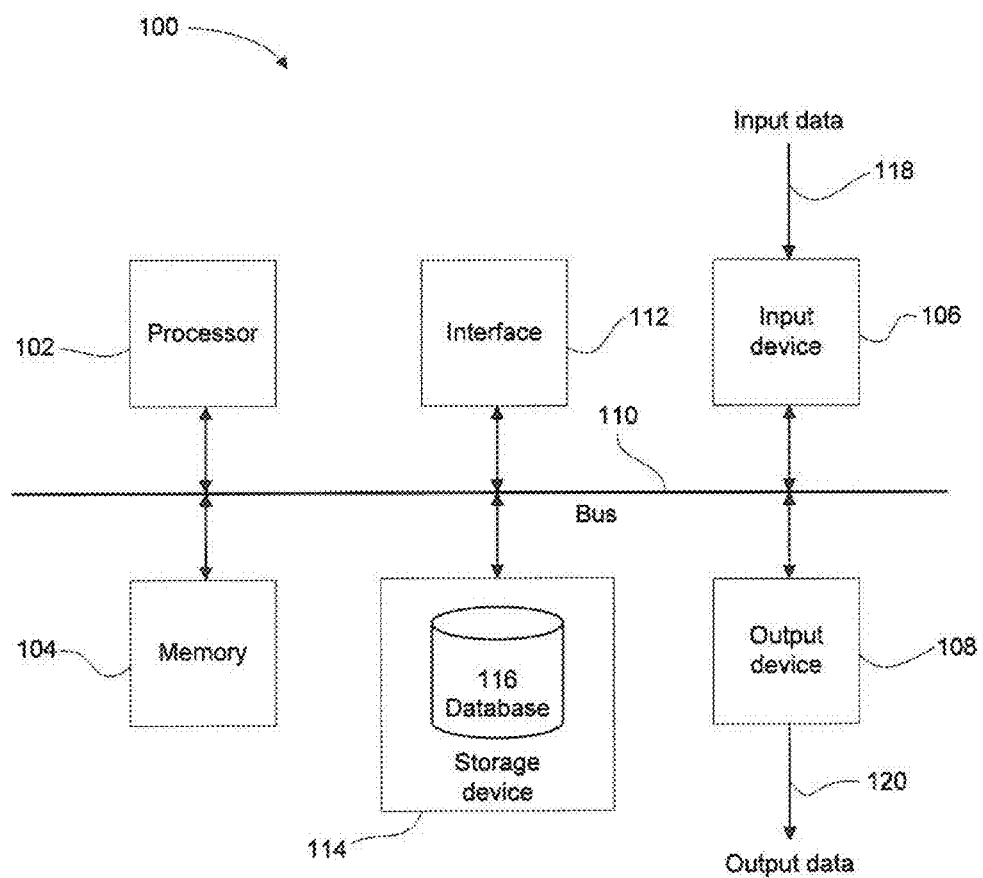
FIG. 1 illustrates a functional block diagram of an example processing system that can be utilised to embody or give effect to a particular embodiment.

Attempts have been made to provide effective security software, as generally discussed below. These attempts have experienced problems in being able to properly recognize unknown software, whether malicious or non-malicious.
Scanner Based Identification—Static, Heuristic and Emulation Static signature solutions may maintain a database of signatures of known malicious and non-malicious software. These stored signatures may include descriptions of file names, file sizes, checksums, more generic string and data sequences, and some amount of code sequences. While the use of checksums or hashes are relatively fast and most commonly implemented, this approach has proven incapable of keeping pace with the massive quantity of released new or updated software. Emulators may attempt to execute a binary file within the emulator's own isolated virtual environment and thereby identify code and data within the binary file.

1. User Behavioral Profiling and Anomaly Detection

User behavioral profiling and anomaly detection systems observe and learn a user's normal behavior over a specified period of time. After that time interval has elapsed, and the user performs actions that are unusual or unknown for that user, the security software disallows those actions as being out of the ordinary.

2. Software Based Anomaly Detection

Software centric anomaly detection systems observe and learn software actions on a computer system over a specified period of time. Any and all of these actions are then permitted to proceed after the time interval has elapsed.

3. Primitive Behavior Blocking

Behavior blockers may maintain simple rules preventing a user from performing very rudimentary tasks, such as adding an unknown program to a start up location. For example, users may be prompted by the Vista® operating system for a selected set of configuration changes for any software. Any significant amount of intelligence is lacking from this determination and the user is barraged with a bewildering array of popup dialogs.

4. Advanced Behavior Blocking

Advanced behavioral detection often amounts to a decision left up to a user. While some intelligence is built into such software products, the detection is not deterministic and leaves much of the work up to the user. Recognition is often not "fine grained" enough in these software products to provide accurate recognition of binaries, resulting in false positives and false negatives, and is often supplemented by simple whitelists and blacklists.

In known security systems it is an interesting problem to recognize the behavior of a legitimate toolbar component as consistently repeating the same outbound connections that often may be mistaken for malicious activity on their own, and the toolbar's auto-run modifications as non-malicious activity for that family of executables, while the toolbar's modification of system executables may be recognized as malicious for that binary when infected.

For terms as used herein, the following example definitions are provided for clarity:

Tracing: recording runtime activity by a process thread and its loaded modules via runtime hooks, debuggers, and other monitoring techniques;

False positive: an incorrect recognition by a security solution of non-malicious run-time behavior or the executable code exhibiting the behavior as malicious;

False negative: an incorrect recognition by a security solution of malicious run-time behavior or the executable code exhibiting the behavior as non-malicious;

Blacklist: a simple and specific list of programs known to be malicious, often containing md5 hashes or other checksums;

Whitelist: a simple and specific list of executables known to be non-malicious, often containing md5 hashes or other checksums;

Behavior-based malicious software recognition: recognizing malicious software by observing unusual or harmful activities performed by those programs at runtime.

In a networked information or data communications system, a user may have access to one or more terminals which are capable of requesting and/or receiving information or data from local or remote information sources. In such a communications system, a terminal may be a type of computer, computer system, processing system, computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data may be provided by software, hardware and/or firmware. A terminal may include or be associated with other devices, for example a local data storage device such as a hard disk drive or solid state drive.

An information source may include a server, or any type of terminal, that may be associated with one or more storage devices that are able to store information or data, for example in one or more databases residing on a storage device. The exchange of information (i.e., the request and/or receipt of information or data) between a terminal and an information source, or other terminal(s), is facilitated by a communication means. The communication means may be realized by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

The network infrastructure may include devices such as a telephone switch, base station, bridge, router, or any other such specialised network component, which facilitates the connection between a terminal and an information source. Collectively, an interconnected group of terminals, communication means, infrastructure and information sources may be referred to as a network. The network itself may take a variety of forms. For example, it may be a computer network, telecommunications network, data communications network, Local Area Network (LAN), Wide Area Network (WAN), wireless network, Internetwork, the Internet and developments thereof, transient or temporary networks, combinations of the above or any other type of network providing for communication between computerised, electronic or digital devices. More than one distinct network may be provided, for example a private and a public network. A network as referenced in this specification may include any type of terminal or other similar type of electronic device, or part thereof, which is rendered such that it is capable of communicating with at least one other terminal.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

5. Processing System and Network

A particular embodiment may be realized using a processing system, an example of which is shown in FIG. 1. In particular, the processing system 100 may include at least one processor 102, or processing unit or plurality of processors, memory 104, at least one input device 106 and at least one output device 108, coupled together via a bus or group of buses 110. In certain embodiments, input device 106 and output device 108 may be the same device. An interface 112 may also be provided for coupling the processing system 100 to one or more peripheral devices, for example interface 112 may be a PCI card or PC card. At least one storage device 114, which houses at least one database 116, may also be provided. The memory 104 may be any form of memory device, for example, volatile or non-volatile memory, solid state storage devices, magnetic devices, or the like. The processor 102 may include more than one distinct processing device, for example to handle different functions within the processing system 100.

Input device 106 may receive input data 118 and may include, for example, a keyboard, a pointer device such as a pen-like device or a mouse, audio receiving device for voice controlled activation such as a microphone, data receiver or antenna such as a modem or wireless data adaptor, data acquisition card, or the like. Input data 118 may come from different sources, for example keyboard instructions in conjunction with data received via a network. Output device 108 may produce or generate output data 120 and may include, for example, a display device or monitor in which case output data 120 is visual, a printer in which case output data 120 is printed, a port for example a USB port, a peripheral component adaptor, a data transmitter or antenna such as a modem or wireless network adaptor, or the like. Output data 120 may be distinct and derived from different output devices, for example a visual display on a monitor in conjunction with data transmitted to a network. A user may view data output, or an interpretation of the data output, on, for example, a monitor or using a printer. The storage device 114 may be any form of data or information storage means, for example, volatile or non-volatile memory, solid state storage devices, magnetic devices, or the like.

In use, the processing system 100 may be adapted to allow data or information to be stored in and/or retrieved from, via wired or wireless communication means, the at least one database 116 and/or the memory 104. The interface 112 may allow wired and/or wireless communication between the processing unit 102 and peripheral components that may serve a specialized purpose. The processor 102 may receive instructions as input data 118 via input device 106 and may display processed results or other output to a user by utilizing output device 108. More than one input device 106 and/or output device 108 may be provided. The processing system 100 may be any form of terminal, server, specialised hardware, or the like.

Figure 2:
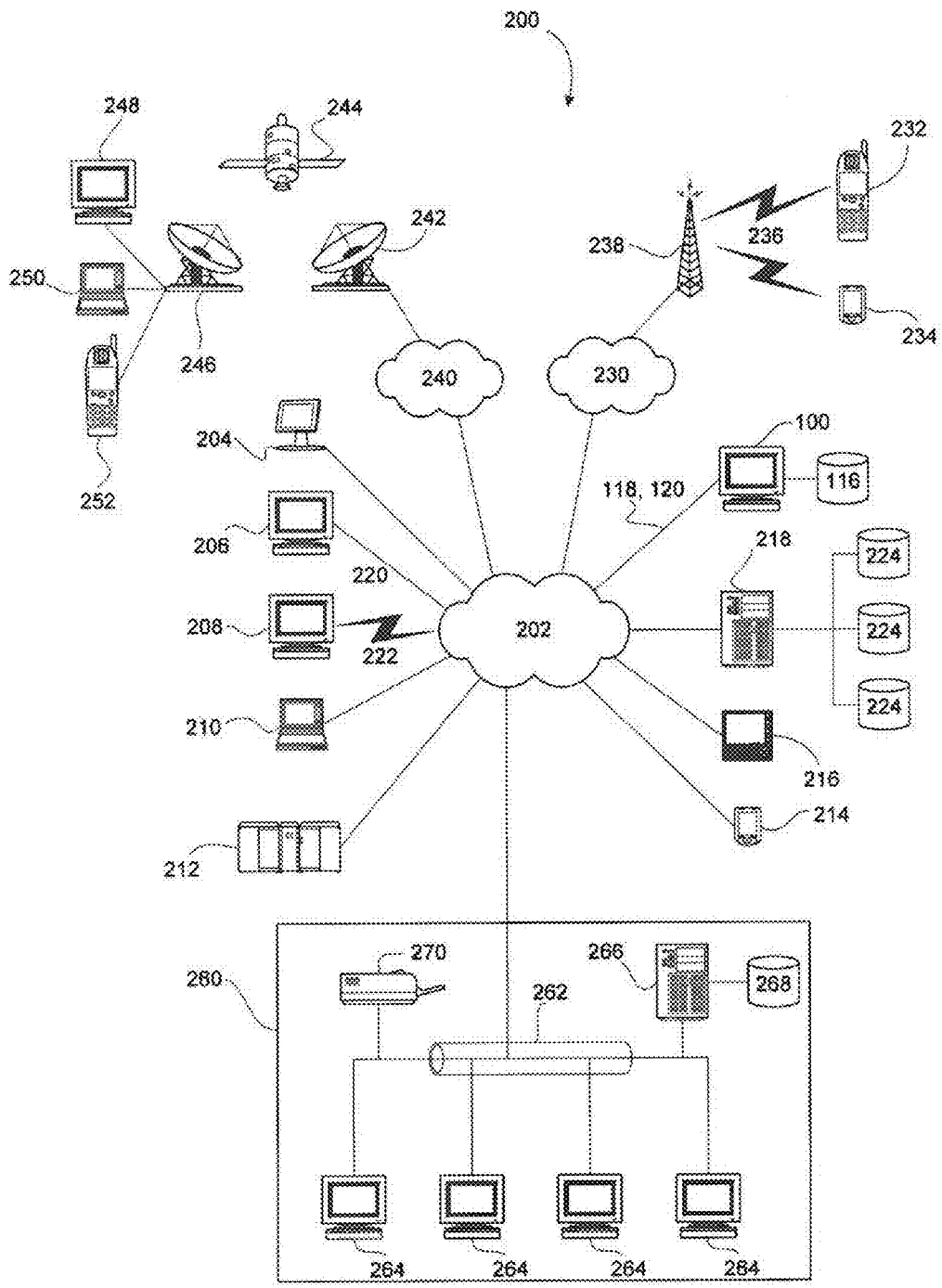
FIG. 2 illustrates an example network infrastructure that can be utilised to embody or give effect to a particular embodiment.

The processing system 100 may be a part of a networked communications system 200, as shown in FIG. 2. Processing system 100 may connect to network 202, for example the Internet or a WAN. Input data 118 and output data 120 may be communicated to other devices via network 202. Other terminals, for example, thin client 204, further processing systems 206 and 208, notebook computer 210, mainframe computer 212, PDA 214, pen-based computer 216, server 218, or the like, may be connected to network 202. A large variety of other types of terminals or configurations may be utilized. The transfer of information and/or data over network 202 may be achieved using wired communications means 220 or wireless communications means 222. Server 218 may facilitate the transfer of data between network 202 and one or more databases 224. Server 218 and one or more databases 224 provide an example of an information source.

Other networks may communicate with network 202. For example, telecommunications network 230 may facilitate the transfer of data between network 202 and mobile or cellular telephone 232 or a PDA-type device 234, by utilizing wireless communication means 236 and receiving/transmitting station 238. Satellite communications network 240 may communicate with satellite signal receiver 242, which may receive data signals from satellite 244, which in turn is in remote communication with satellite signal transmitter 246. Terminals, for example further processing system 248, notebook computer 250 or satellite telephone 252, may communicate with network 202. A local network 260, which for example may be a private network, LAN, etc., may also be connected to network 202. For example, network 202 may be connected with Ethernet 262 which connects terminals 264, server 266 which controls the transfer of data to and/or from database 268, and printer 270. Various other types of networks may be utilized.

The processing system 100 may be adapted to communicate with other terminals, for example further processing systems 206, 208, by sending and receiving data, 118, 120, to and from the network 202, thereby facilitating possible communication with other components of the networked communications system 200.

For example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, Ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

6. Overview

In one form a system is provided that may include a server-side terminal and a client-side terminal implementing kernel-based process monitoring combined with user level operating system Application Protocol Interface (API) hooks. The user mode components and kernel mode components may monitor processes running in a client terminal (e.g. user processing system 100), programmatically examining and auditing software based on runtime events for the purpose of behavioral profile recognition.

In one embodiment, the runtime events may be system and application function calls, temporary and persistent in-memory and on-disk data, abstracted data types and changes to various system characteristics. The events and their sets of occurrence may be translated via a language to describe a behavioral based pattern (i.e., a recognizable pattern) for recognition purposes. This set of events may be distributed to terminals in a network and then interpreted at unknown software runtime to aid in precise real-time behavioral based recognition of known malicious and/or non-malicious software.

On the server-side terminal, events may be recorded for executable code at runtime for examination and translation via tracing. Process and system events may be traced using injected recording software components and kernel based components. These events may be made up of, for example, recorded system API and subroutine calls, the loaded module making the call, the parameter values passed to these calls, and in-memory and on-disk data. The relationships of these events to each other may be recorded, examined and interpreted.

Events may be manually, automatically and/or semi-automatically selected and then described using a language. The language may describe absolute memory locations, memory offsets and locations relative to abstract data types like the thread stack, API and subroutine calls and parameter values, and the persistence of values across API calls such as handles to files and network ports. Some of the data described by the language may not be detected by the tracing process and may need to be manually identified, for example but not limited to, using debugging and other monitoring techniques.

On the client-side terminal, events may be monitored for recognition at runtime of unknown software, i.e., unknown or unrecognized at the client terminal at that point in time, using injected user mode components and kernel based components. Based on the collections of events as described by the language, the software activity may be compared against previously obtained recognizable patterns.

In one embodiment, the present method may not be concerned solely with identifying malicious or suspicious actions. The present method may recognize a set of inter-related events associated with an individual piece or package of software or any type of executable file.

The present method of precise real-time behavioral recognition may determine the identity of both malicious and non-malicious software based on the set of inter-related events. Events in this sense may include a more complex and lower level inter-relational set.

Furthermore, the present method of precise real-time behavioral recognition does not use statistical methods for identification purposes. Recognition may be based on the set of inter-related events, and events may not be required to be weighted, rated or scored. In addition, the events may not necessarily be sequential. A set of inter-related events, the events' specific attributes, and inter-relationships may be described by a language and then recognized at run-time. The set as a whole is what is important. In one embodiment, calculations and formulas are not required.

Conceptually, the present method of behavioral recognition is "many to one", while current methods of attempting to behaviorally detect malicious activity are "one to many". The present method of precise real-time behavioral recognition deals with the identification of a set of behaviors and an inter-related set of dynamic characteristics during software execution on a terminal to recognize an individual executable file or piece or package of software.

For example, the present method of behavioral recognition may be used to recognize that a particular internet connection, in light of multiple other in-memory and execution characteristics, is a part of the family of a legitimate Google® toolbar's ongoing and unknown releases, or on the other hand, is a part of the family of Spyware Gamer's ongoing and unknown releases. Not only is the set recognized, but the corresponding software exhibiting the behavior may be precisely identified as well.

Figure 3:
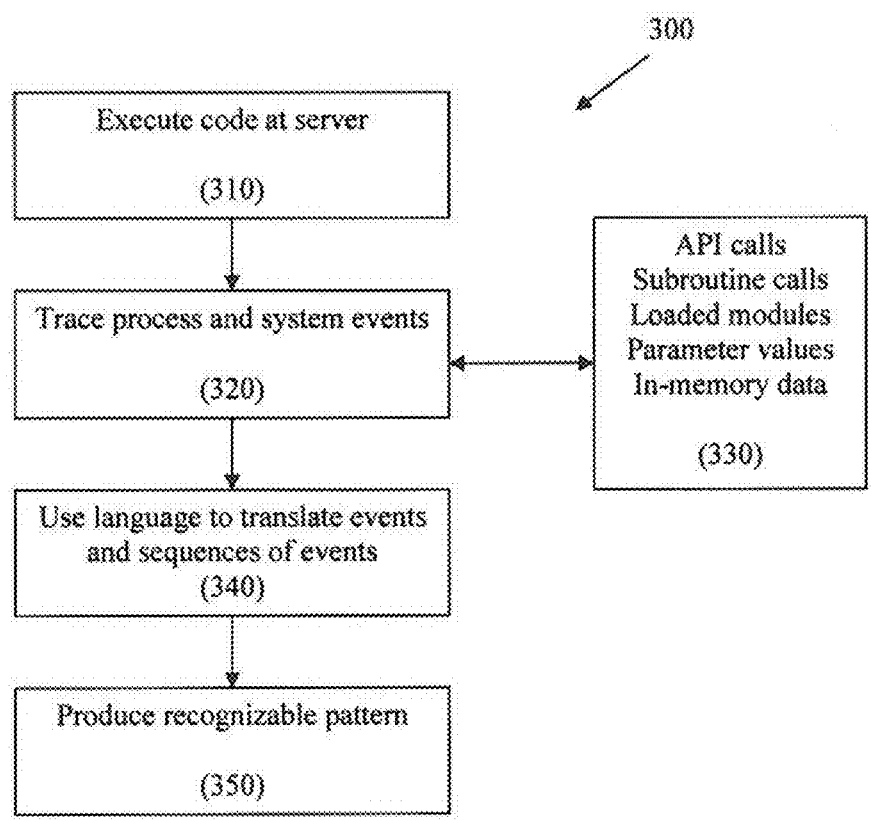
FIG. 3 illustrates a flow diagram of a method/process providing a particular example embodiment.

Referring to FIG. 3, there is illustrated a method 300 of behavioral recognition for software. At step 310, code, software, an executable file, or the like, may be executed or ran at a terminal. In one embodiment, the terminal may be a server. At step 320, process and system events may be traced, for example by using the elements of step 330, including API calls, subroutine calls, loaded modules, parameter values, in-memory data, or the like. At step 340, a language may be used to translate the traced events and the sets of inter-related events. At step 350, a recognizable pattern may be produced so that the software, when subsequently executed on another terminal, such as a client terminal, may be recognizable.

Example Events and Sets of Events

Interesting process and system events may include, but are not limited to: File creation, file mapping, file copy, file modification, file read, registry value modification, registry key deletion or creation, code execution from non-loaded-module location, network connection, process creation, process enumeration, thread creation, remote thread creation, memory write, module load, windows hook set, service manager interaction, heap allocation, and/or memory range protection modification.

The sequence of events may be unimportant, however, identifying a set of events may be significant. For example, a password stealing worm may maintain an unusual set of events that uniquely identify its behavior and runtime memory characteristics. This stealer may enumerate the temporary directory, create a dynamic link library (dll) file there, load the dll file into its own process, find out the name of its own executable image loaded in its process, identify the system directory, copy that on-disk name to the system directory, drop another dll in the system directory, identify itself again, set a registry run key, and then inject position independent code into explorer.exe. That set of events may be recognized at runtime.

Tracing—Injected Software Recording Components

Tracing may be performed by, but is not limited to, injected position independent code within any or all processes, or by a loaded dynamic link library, that places user mode hooks on subroutines of interest. These hooks and their callback code may record system activity. The injection or library load may occur during process creation and startup. Either of these methods may appropriately hook API's and subroutines of interest. This tracing code may identify the process it is tracing by a process identifier (PID), the loaded module within the process that is responsible for a call of interest, the virtual memory location of the call, the identity of the call, call parameters and associated data for the call, and the return result.

In addition to API traces, the user mode components may identify arbitrary in-memory and on-disk data at runtime for matching. This data may be located via relative position to structures like the current thread stack, at absolute virtual addresses, or on-disk.

Tracing—Kernel Based Recording Components

Tracing at the kernel level may include callback routines implemented within device drivers and inline function hooks for file I/O, registry, process, and network events. The drivers may examine an IRP as it is passed up the stack, holding on to the IRP until analysis is completed. The events identified by these functions may be recorded and notification details may be passed back to the recognition engine in user-mode.

Language and Translation of Events into Recognition Pattern

A high level language may be used to describe these recognizable runtime patterns of events that include both relational variables and the software's actions. One possible format may include a set of relational variables and a set of events.

Events may include tags describing an abstract action, which may be a user mode function call or set of calls, or a filtered kernel mode IRP event. The action may have a subject that it is acting upon, describing the nature of the action. For example, setting a registry value may be represented with a label for the type of action and the object that is being acted on:

WRITE:REGISTRY

The abstract notion of an action may be supplemented with one or more parameter values. These values may specify the data associated with the event. For example, setting a registry key value, where the key string includes "Control Panel\Settings\Time" may be specified:

WRITE:REGISTRY PARAM:CONTAINS "Control Panel\ Settings\Time"

The pattern may include exact data for the value being written, ambiguous data, or the data may be gathered from a previous action. In this format, the value being set may be gathered from a previous query:

WRITE:REGISTRY PARAM:CONTAINS "Control Panel\Settings\Time" DATA:CONTAINS %volume_serial_number%

Recognizable Patterns

Two non-limiting examples of malicious patterns may include relational variables and a set of actions containing those variables. For example, the malware labelled "Vundo" may perform the following actions:

Creates the "Time" value in the registry key "Control Panel\ Settings",

Queries the "C:\" volume for the serial number, sets the data belonging to the "Time" value to the serial number, Creates a "GUID" subkey under the registry key "CLSID", Registers the "GUID" as a execution hook under the registry key "ShellExecuteHooks".

Example Recognizable Pattern 1:

```
<relational data>
%time_value%
```

Example Recognizable Pattern 1:

```
%volume_serial_number%
%GUID%
</relational data>
<actions>
CREATE:           PARAM:CONTAINS          DATA:CONTAINS
REGISTRY          "Control Panel\Settings"  "Time"
QUERY:FILE        PARAM:IS "C:\"          DATA:RECORD
                                          %volume_serial_number%
WRITE:            PARAM:CONTAINS          DATA:CONTAINS
REGISTR           "Control Panel\
                  Settings\Time"
                                          %volume_serial_number%
CREATE:           PARAM:CONTAINS          DATA:RECORD
REGISTRY          "CLSID"                 %GUID%
WRITE:            PARAM:CONTAINS          DATA:CONTAINS
REGISTRY          "ShellExecuteHooks"     %GUID%
</actions>
```

In another example, a software package may perform the following uniquely recognizable actions:

Accesses the running process "explorer.exe" by way of its process identifier,

Checks if the "Physical Address Extension" processor feature is enabled,

Creates a file mapping supported by the windows "page file",

Acquires a pointer to the "NtMapViewOfSection" function,

Makes the file mapping available in memory and writes x86 executable code into the memory, Makes this file mapping based memory available in the "explorer.exe", Creates a thread in the "explorer.exe" process to begin execution on this newly mapped memory.

Example Recognizable Pattern 2:

```
<relational data>
%explorer_handle%
%filemap_handle%
</relational data>
<actions>
OPEN:PROCESS      PARAM:CONTAINS "explorer.exe"         DATA:RECORD %explorer_handle%
QUERY:OS          PARAM:                                DATA:IS "Physical Address Extensions"
CREATE:FILEMAP    PARAM:IS "PAGE_FILE"                  DATA:RECORD %filemap_handle%
QUERY:OS          PARAM:                                DATA:CONTAINS "NtMapViewOfSection"
OPEN:FILEMAP      PARAM:                                DATA:IS %filemap_handle%
WRITE:MEMORY      PARAM:IS %filemap_handle%             DATA:CONTAINS
"EXECUTABLE_CODE"
WRITE:REGISTRY    PARAM:CONTAINS "ShellExecuteHooks" DATA:CONTAINS %GUID%
OPEN:PROCESS      PARAM:IS %explorer_handle% IS %filemap_handle%           DATA:
CREATE:THREAD     PARAM:IS %explorer_handle%            DATA: CONTAINS
FILEMAP_MEMORY
</actions>
```

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for recognizing behavioral attributes of software in real-time, comprising:
   executing an executable file;
   tracing one or more non-sequential runtime events and a set of inter-related dynamic characteristics associated with the one or more non-sequential runtime events, the set of inter-related dynamic characteristics being associated with a behavior of the executable file, the one or more runtime events comprising a function call and abstract data types;
   translating the one or more non-sequential traced runtime events and the set of inter-related dynamic characteristics from machine code to a high level language, the high level language comprising one or more labels written in human-readable text to describe the one or more traced non-sequential runtime events and the set of inter-related dynamic characteristics; and
   producing a recognizable pattern of the translated traced non-sequential runtime events based at least in part on the set of inter-related dynamic characteristics, wherein the pattern comprises a unique behavioral set of the translated traced runtime events.

2. The method of claim 1, further comprising distributing the recognizable pattern to one or more client terminals.

3. The method of claim 2, wherein the recognizable pattern is distributed to the one or more client terminals via a web server.

4. The method of claim 1, wherein the one or more non-sequential runtime events are traced using Application Programming Interface (API) calls.

5. The method of claim 1, wherein the one or more non-sequential runtime events are traced using subroutine calls.

6. The method of claim 1, wherein the high level language describes absolute memory locations of the one or more traced non-sequential runtime events.

7. The method of claim 1, further comprising manually identifying non-sequential runtime events to translate to the high level language.

8. The method of claim 1, further comprising automatically identifying non-sequential runtime events to translate to the high level language.

9. The method of claim 1, wherein the method is implemented by a server.

10. A computer-implemented method for recognizing behavioral attributes of software in real-time, comprising:
    receiving one or more recognizable patterns from a server, wherein the one or more patterns are associated with non-sequential runtime events and a set of inter-related dynamic characteristics of an executable file, the non-sequential runtime events and the set of inter-related dynamic characteristics being associated with a behavior of the executable file, and comprising a function call and abstract data types, the non-sequential runtime events of the executable file being translated from machine code to a high level language, the high level language comprising one or more labels written in human-readable text to describe the one or more traced non-sequential runtime events and the set of inter-related dynamic characteristics;
    executing an unidentified executable file;
    monitoring runtime events associated with the unidentified executable file;
    associating the monitored runtime events with a recognizable pattern received from the server; and
    identifying the unidentified executable file based on the recognizable pattern associated with the monitored runtime events, the recognizable pattern being based on the one or more labels.

11. The method of claim 10, further comprising implementing kernel based components to monitor the runtime events of the unidentified executable file.

12. The method of claim 10, further comprising identifying the unidentified executable file as a malicious executable file.

13. The method of claim 10, further comprising identifying the unidentified executable file as a non-malicious executable file.

14. A server system configured to recognize behavioral attributes of software in real-time, comprising:
    a processor;
    memory in electronic communication with the processor;
    the server configured to:
        execute an executable file;
        trace one or more non-sequential runtime events and a set of inter-related dynamic characteristics associated with the one or more non-sequential runtime events, the set of inter-related dynamic characteristics being associated with a behavior of the executable file, the one or more runtime events comprising a function call and abstract data types;

translate the one or more non-sequential traced runtime events and the set of inter-related dynamic characteristics from machine code to a high level language, the high level language comprising one or more labels written in human-readable text to describe the one or more traced non-sequential runtime events and the set of inter-related dynamic characteristics; and produce a recognizable pattern of the translated traced non-sequential runtime events based at least in part on the set of inter-related dynamic characteristics, wherein the pattern comprises a unique behavioral set of the translated traced runtime events.

15. The system of claim 14, wherein the server is further configured to distribute the recognizable pattern to one or more client terminals.

16. The system of claim 15, wherein the recognizable pattern is distributed to the one or more client terminals via a web server.

17. The system of claim 14, wherein the one or more non-sequential runtime events are traced using Application Programming Interface (API) calls.

18. The system of claim 14, wherein the one or more non-sequential runtime events are traced using subroutine calls.

19. The system of claim 14, wherein the high level language describes absolute memory locations of the one or more non-sequential traced runtime events.

20. The system of claim 14, wherein the server is further configured to manually identify non-sequential runtime events to translate to the high level language.

* * * * *